United States Patent [19]

Levine

[11] Patent Number: 4,783,800
[45] Date of Patent: Nov. 8, 1988

[54] REMOTE CONTROLLED INTERACTIVE SCHEDULER SYSTEM

[76] Inventor: Alfred B. Levine, 2924 Terrace Dr., Chevy Chase, Md. 20815

[21] Appl. No.: 831,878

[22] Filed: Feb. 24, 1986

Related U.S. Application Data

[63] Continuation-in-part of Ser. No. 566,312, Dec. 28, 1983, and a continuation-in-part of Ser. No. 580,158, Feb. 14, 1984.

[51] Int. Cl.⁴ .................... H04M 1/64; G04B 47/00
[52] U.S. Cl. .......................... 379/67; 379/77; 379/88; 379/104; 368/10
[58] Field of Search ............... 179/84 VF, 2 A, 2 EC, 179/18 BE, 5 R, 6.03, 6.04, 6.07, 6.11; 364/401, 407; 379/110, 96, 101, 102, 361, 70, 71, 72, 74, 76, 77, 67, 88, 89, 104, 105; 368/10, 28, 41; 340/309.4, 825.73, 825.74

[56] References Cited

U.S. PATENT DOCUMENTS

| | | | |
|---|---|---|---|
| 4,071,698 | 1/1978 | Barger, Jr. et al. | |
| 4,074,251 | 2/1978 | Creely | 340/309.4 |
| 4,162,610 | 7/1979 | Levine | 368/41 |
| 4,302,752 | 11/1981 | Weitzler | 340/309.1 |
| 4,307,266 | 12/1981 | Messina | |
| 4,320,256 | 3/1982 | Freeman | 379/71 |
| 4,359,607 | 11/1982 | Hannig et al. | 179/6.03 |
| 4,420,656 | 12/1983 | Freeman | 179/6.04 |
| 4,485,463 | 11/1984 | Kita | 368/41 |
| 4,489,438 | 12/1984 | Hughes | 179/2 A |
| 4,503,288 | 3/1985 | Kessler | 379/96 |
| 4,517,410 | 5/1985 | Williams et al. | 379/73 |
| 4,540,856 | 9/1985 | Fujii et al. | 179/89 |
| 4,548,510 | 10/1985 | Levine | 368/10 |
| 4,554,418 | 11/1985 | Toy | 379/88 |
| 4,591,664 | 5/1986 | Freeman | 379/73 |
| 4,650,927 | 3/1987 | James | 379/96 |

FOREIGN PATENT DOCUMENTS

| | | | |
|---|---|---|---|
| 5960558 | 9/1982 | Japan | 340/401 |
| 1180916 | 4/1983 | U.S.S.R. | 364/407 |

OTHER PUBLICATIONS

Audio Bionics, "Lifestyle Personal Communicator", brochure.
Rabiner et al, Proceedings of the IEEE, vol. 64, No. 4, Digital Techniques for Computer Voice Response, Apr. 1976, pp. 416–433.
Vynet Corp., Desktop System Talks on Phone, Electronics, Jan. 27, 1983, p. 141.
Ozawa et al., Voice Response System and Its Applications, Hitachi Review, vol. 28 (1979) No. 6, Dec.

Primary Examiner—Keith E. George

[57] ABSTRACT

An interactive remote controlled scheduling system for enabling a caller at one end of a telephone line, or other channel, to automatically schedule an appointment with an electronic scheduling machine at a receiving end in the absence of human intervention at the receiving end. Upon the caller dialing and reaching the electronic scheduler, a sequential series of interactive audible instruction messages are received to initially instruct the caller to dial back the day desired for appointment, and in reply to receive back from the electronic scheduler, a subschedule of the times available for appointment on this day as an audible announcement. The caller is then instructed to dial back a desired time-of-day from those announced as available, and this dialed time is received and automatically entered into the electronic scheduler to complete the appointment. Additionally, the caller can be instructed to dial other numbers, and in reply, to receive back any audible messages that have been stored for the caller at the receiving end. In an alternative system, the caller merely obtains a schedule or subschedule of available times upon dialing the number of the electronic scheduler and subsequently dialing the day of interest.

14 Claims, 2 Drawing Sheets

REMOTE CONTROLLED INTERACTIVE SCHEDULER SYSTEM

RELATED APPLICATIONS

This application is a continuation-in-part of copending application Ser. No. 566,312, filed Dec. 28, 1983 and of Ser. No. 580,158, filed Feb. 14, 1984.

STATEMENT OF INVENTION

This invention generally relates to electronic time schedulers and appointment scheduling systems, and more particularly to remote controlled, interactive time scheduling systems.

BACKGROUND

In copending application Ser. No. 566,312 there is disclosed an electronic time scheduler for selectively storing and reading out schedules of appointments each day for a series of days. These schedules are presented to a user by any one or more of a visual display, print-out, or an audible announcement. At the election of the user, subschedules of remaining times-of-day that are still available for appointment can be presented along with, or instead of, the schedules.

In copending application Ser. No. 580,158, an electronic scheduler presents a multiple day schedule of events and appointments in such manner to assist the user in scheduling or finding appointments for a series of different days in an expeditious manner. The multiple days schedules can be presented concurrently on a visual display screen in a side-by-side manner or similarly on a printed record. Alternatively, or additionally, the schedules or subschedules for the selected series of days can be audibly presented as an announcement to the user.

SUMMARY OF THE INVENTION

According to the present invention, there is provided a remote controlled electronic scheduling system, employing the above mentioned electronic schedulers, in a system that enables a user to make or change appointments with another who is located at a distance from the user. The system can employ a telephone link, radio link, or other communication channel for transfering scheduling information between the distantly separated persons, and the information can be transmitted by digital signals, audible tones, or in other manner permitted by the communication channel. The scheduling is performed in a unilateral fashion by the sender or user without the need for human intervention or human response from the other end of the communication channel. This enables the sender or user to make or change appointments at any time regardless of the presence of a person at the other end of the channel. At the other end of the channel, the electronic scheduling system interacts with the sender and automatically instructs the sender, as needed, with respect to the transfer of scheduling information to and from the sender.

This remote controlled scheduling system may be additionally supplemented by an interactive message transfer system linking the user or sender with the remotely located station. Like the scheduling system, the message transfer system is controlled unilaterally by the sender and does not require the presence of a person at the receiving station. Accordingly the message transfer can be made at any time at the convenience of the sender or user regardless of the presence of a person at the receiving station or location.

DETAILED DESCRIPTION OF PREFERRED EMBODIMENTS

Figure 1:
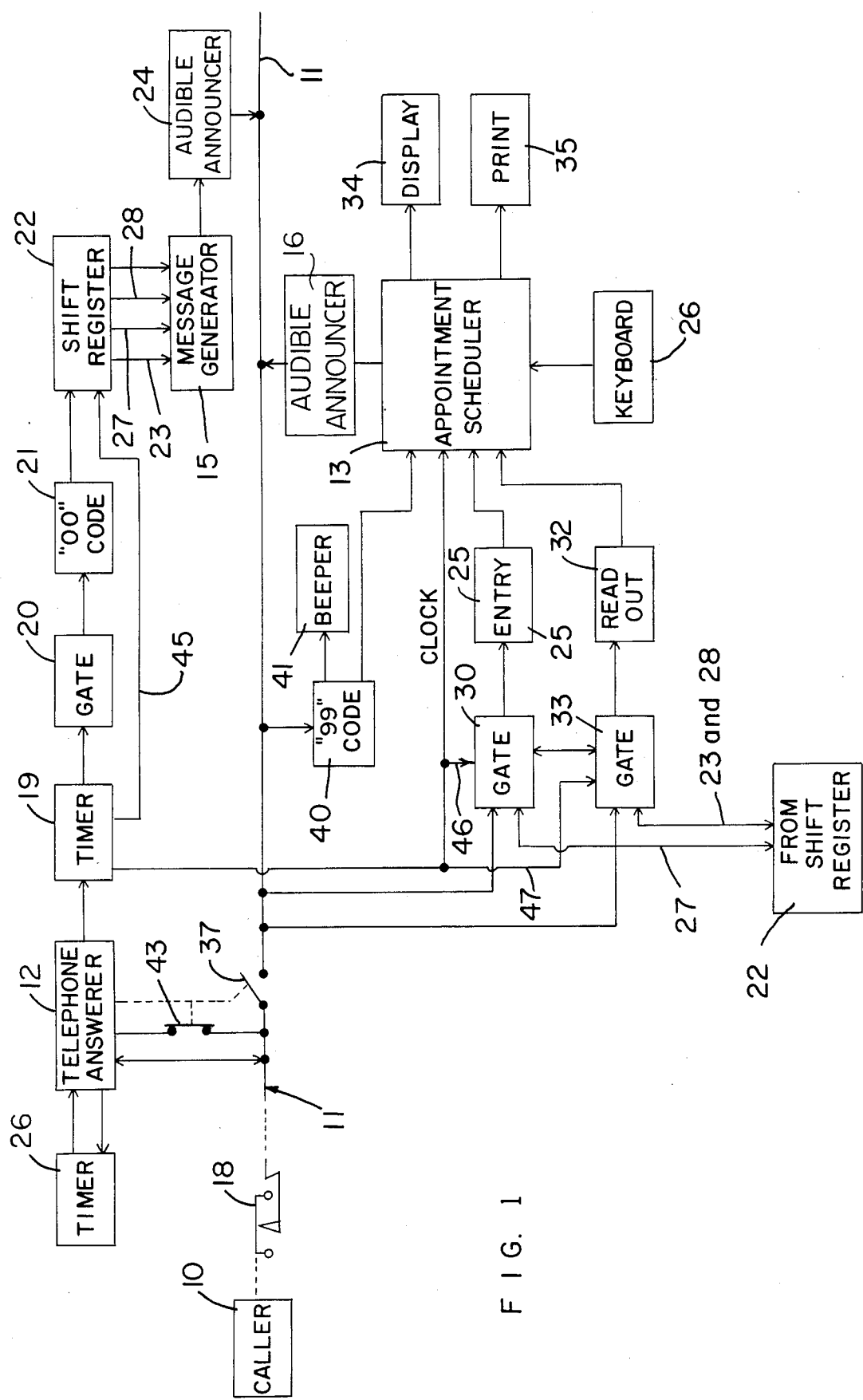
FIG. 1 is an electronic block diagram showing one preferred remote contolled scheduling system according to the invention, controlled by a timer.

Referring to the drawings, FIG. 1 shows one preferred system for enabling a caller 10 located at one end of a telephone line 11, or other transmission medium, to automatically and unilaterally make or change appointments with another person located at the opposite, distant end of the line 11. In the system illustrated, the location at the remote end of the line 11 may be the office of a Chiropractor, Dentist, or other professional, business, or other individual; and the caller 10 may be a patient or Client seeking to make an appointment on a mutually available day and time with the person being called.

At the sending end of the line 11, there is provided only a telephone or other terminal 18 having a hand operated dial or digital keypad (not shown). At the receiving end of the line 11, is provided an automatic telephone answering machine 12, an electronic appointment scheduler 13, message generator 15, having a series of prerecorded instructions, and various controls for interactive functioning as will be described.

The telephone answerer 12 may be of conventional design that responds to the reception of the called digital number to close the line switch 37, begin the timer 26, and connect the caller 10 to a prerecorded message in the telephone answerer 12. The electronic appointment scheduler 13 is as disclosed in the above copending applications that stores in its internal memory (not shown), schedules of appointments and events for a number of different days. This memory is accessible by a keyboard 26, to read-out the schedules, or subschedules of availabilities, for any day or days selected, and to present the selected schedules, or subschedules, to a user by way of any one or more of a visual display screen 34, a printed record 35, or an audible announcer 16.

The message generator 15 contains a plurality of prerecorded or preentered messages, any one of which can be selectively accessed by a shift register 22, and the signals of the message sent out in audible form over the telephone line 11 by audible announcer 24. Solid state message generators of this type are presently widely used in automobiles, and various other machines and vehicles, where it is desired to provide the user with audible messages of warnings or instructions or others.

The remaining portions of the system of FIG. 1 comprise various electronic controls that will be described below for an understanding of the system.

Upon reception of a telephone call from the calling party 10, the telephone answering machine 12 is activated to complete the telephone connection, close switch 37, commence operation of the timer 16 and to generate a message back to the caller 10. The message instructs the caller 10 to dictate the caller's name address, telephone number, and briefly state the reason for the call. The The answering machine also instructs the Caller 10 to dial in , or key on the calling phone 18 a code number, such as "00", after the caller 10 audibly dictates this identifying information. Concurrently with the initial instructions to the caller 10, the machine also actuates a timer 19 to close an and gate circuit 20, for a fixed time interval, connecting the telephone line 11 to the remainder of the receiving system.

The audible reply from the caller 10 is received and recorded in the answering machine, in conventional fashion, to identify the caller 10 and the reason for the call; and the entry of the code "00" by the caller 10 into the line 11 is detected at the receiving system to begin the automatic, interactive scheduling of an appointment. The transmitted code number "00" is detected by a code detector 21 at the receiver end through closed gate 20 to pulse a shift register 22 to its first energized output line position 23. This commences the interactive scheduling process, by generating a first instruction message from solid state generator 15, that is sent in audible form by audibilizer 24 back over telephone line 11 to the caller 10. This first instruction requests the caller 10 to select the month and day when an appointment is desired and to dial or key into the phone 18 the number for this month and day. Energized line 23 of the shift register 22 also closes an and gate circuit 33 connecting the telephone line to the read-out circuit 32 of the appointment scheduler 13. Upon the caller 10 responding by dialing in the number of the month and day, these digital signals are transmitted over the telephone line 11 and passed through gate 33 to the selected portion of the memory of scheduler 13 for that month and day, to read out the subschedule for that day, in the same manner as if the memory were accessed by the keyboard 26. As disclosed in the above mentioned applications, the scheduler 13 produces a listing, or subschedule, of all those remaining times of day when appointments have not been scheduled, and this information is audibilized by announcer 16. The scheduler 13 also includes a visual display panel 34 and a printer 35, and the subschedule may also be visually shown on the screen 34 or printed as a record. In the present application, this audible subschedule is directed over telephone line 11 to the caller 10 to automatically inform the caller of the times available for appointment on the selected day.

A preset time after announcing the subschedule back to the caller 10, the timer 19 pulses shift register 22 to advance to its next position energizing line 27. Energized line 27 triggers the message generator 15 to instruct the caller 10 by a second audible message, to select one of the available times from the previously announced subschedule and to dial that number into phone 18, or Touch Tone it in on the phone key board. Energized line 27 of register 23 also closes the gate 30 of the scheduler 13 and opens gate 33, thereby conditioning the scheduler for the entry of an appointment. When the caller responds by dialing in the number for the time of appointment, this number is digitally transmitted over line 11 and through closed gate 30 and entry circuit 25 to be entered as an appointment into the memory of the scheduler 13 for that day. Thus the series of automatically generated messages sent by the message generator 15 back to the caller 10 instructs the caller 10 to select the day for appointment and enter that day, and also instructs the caller 10 to select a time-of-day from those available for appointment, and enter that selected time-of-day. The appointment scheduler 13 at the receiving end is controlled by the entries made by the caller 10 to provide the subschedule of available times for the day selected, and to enter into its memory, the appointment time selected by the caller 10.

In the event that the caller 10 is unable to find a suitable time available in the subschedule for that selected day, the caller 10 is also instructed by the second message from message generator 15, to instead, again dial the code "00". This code is received through gate 20 and code detector 21, to advance the shift register 22 to its next position, energizing line 28, leading to message generator 15 and generating the third message from generator 15. The third message instructs the caller 10 to select a different day for appointment and to enter that different day by dialing it into the phone 18. Shift register line 28 also opens entry gate 30 of the scheduler 13 and closes read out gate 33, preparing the scheduler 13 to read out the subschedule of availabilities for the next selection to be made by the caller 10. Again the scheduler 13 responds to the caller's subsequent selection of a day and responds as before. In the same manner, these interactive steps between the caller 10 and the circuity and machines at the receiving end are repeated for a few different days until the caller 10 succeeds in making an appointment and entering it into the scheduler 13. If the caller 10 cannot do so after trying for a few repeat procedures, the caller 10 is later instructed by a subsequent message from generator 15, to call a different phone number for direct access to a receptionist or other person for completion of an appointment in a normal, manual manner.

After the caller 10 completes the step of entering the appointment in scheduler 13, as discussed above, a later message from message generator 15 instructs that the caller 10 audibly dictate into the answering machine 12 the day and time set for appointment; thereby to provide oral confirmation of the appointment time that has been entered into the scheduler 13. This recording occurs immediately after the caller's name, address, phone, and reason for appointment. At periodic intervals during the day, or before closing the office of night, a nurse at the reciving end of the phone line, or other person, may call back all caller's scheduled for appointments the following day, to directly confirm the availabilities for appointment.

Since many persons may be unwilling, or unable, to unilaterally schedule appointments in this interactive manner the initial message from the telephone answerer 12 can instruct the caller 10 to instead visit the office of the person called and make an appointment, or to telephone a different phone number to receive personal assistance in making an appointment in the conventional manner. As is conventional, the telephone answerer 12 internally includes a timer 16 to disconnect at 43 and 37, the machine 12 and receiving system from the phone line after a period of time has expired. Thus prevents the answering system at the receiving end from being occupied for overly long periods, resulting from wrong number callers and other errors, and unusual delays. Upon the caller 10 terminating the call, the connections at the receiving end, and the circuitry, including the gates and shift register 22, are reset to initial conditions, in readiness for receiving the next telephone call to make an appointment.

For purposes of additional confirmation, an internal clock within timer 26 may enter the time and date signals into the scheduler 13 as each appointment is entered; and also the time and date, in analog oral manner, into the recording in the automatic answering machine 12.

It will be noted that employing the automatic interactive scheduling system as disclosed, a caller 10 may make appointments at any hour of the day or night regardless of office hours at the receiving office. Thus appointments can be made by telephone from locations at different time zones regardless of whether a person is available at the receiving end when the call is made. Additionally, a great deal of time is saved at the receiving office, since the callers unilaterally select the most convenient date and time and unilaterally enter both into the scheduler 13 and also into the telephone answering machine 12. Still further, the callers 10 can unilaterally cancel any previous appointment, or change the date or time, subject of course, to advising the receiving office sufficiently in advance of making any such cancellations or changes, or complying with other reasonable restrictions of the receiving office. In the event of any emergency, the caller 10 is audibly instructed by the answering machine 12 to directly call a different emergency number, or hospital, or other location. The caller 10 may also dictate a brief message into the answerer 12 calling attention to the emergency, along with a call back number. Still further, the receiving system may be provided with a detector 40, on line 11, that responds to a fixed code, such as "99", indicative of an emergency. The caller 10 may be instructed to dial this number "99" and have it entered into the scheduler 13. At the scheduler 13, the visual display screen 34, may be constantly energized, and periodically monitored by a nurse, receptionist, or other person, to observe the changing schedules for that day. In the event that the emergency number "99" appears on the screen 34, the telephone answering device 12 may be replayed to identify the caller 10 and to promptly respond as necessary. An audible beeper (not shown) may also be connected to be energized by code detector 40, and to audibly respond in the event that an emergency call "99" is received.

It will be noted, that a caller 10 seeking to make an appointment does not require any special equipment at the calling end, only a conventional dial type or touch tone telephone. All instructions and scheduling information are automatically sent back to the caller 10 in audible form, and the caller 10 sends information audibly and digitally using only the telephone 18. Thus the caller 10 can make the appointments from home, from a payphone, portable phone, or elsewhere. This remote controlled system for making appointments is also not limited to the use of telephones or telephone lines but can be employed using other communication channels such as radio wave, microwave, soundwave, lightwave, or other. In the event that the caller 10 has available a digital computer or digital terminal and modem at the sending end of the communication channel, the instructions and scheduling information sent back from the receiving end to the sending end may alternatively, or additionally, be transmitted in digital form, from the scheduler 13, message generator 15, and telephone answering machine 12. In this event, the messages, instructions, and subschedules may be visually displayed or printed for the caller 10 at the sending end of the communication channel, in addition to, or instead of, being received in audible form.

Figure 2:
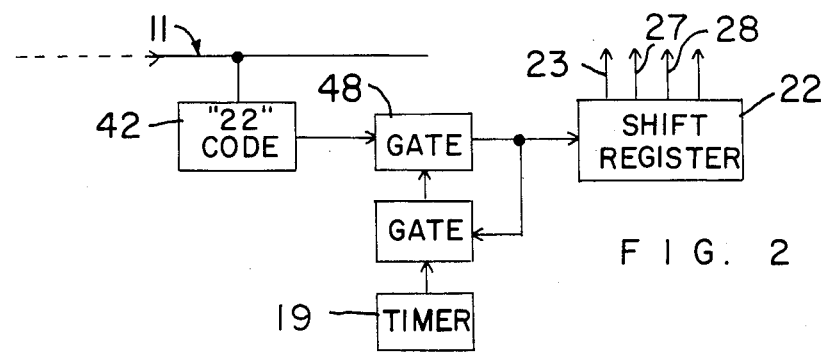
FIG. 2 is a block diagram of a portion of a system, showing control of the transferring of scheduling information by signals sent from the sending station.

In the system of FIG. 1, each of the sequence of instructions and responses is controlled to occur for a present period of time by the timer 19, that is started by the reception of each telephone call from a caller 10. The time closes gate 20 to prepare for initial operation; and thereafter progressively advances the shift register 22 for the different operations and concurrently controls the gate circuits 30 and 33 of the scheduler 13 for read-out of subschedules and entry of appointments, as described above. Each step is controlled to provide sufficient time period for that operation. As an alternative, these time periods can also be partially controlled by the caller 10 to either speed up any step, or slow it down. This can be performed as shown in FIG. 2 by having the caller 10 interactively terminate each step by signaling when it is completed. Referring to FIG. 2, an additional code detector circuit 42 is provided at the receiver end responsive to receiving the digital number "22", or other. The output of 42 transmits a pulse through or circuit 48 to the shift register 22, thereby to advance the shift register 22 in response to each pulse to commence the next succeeding operation as described above. Or circuit 48 is also energized by the clock in timer 19, which generates pulses at spaced apart time intervals, corresponding to the maximum interval for each operation in the sequence. The caller 10 is instructed by each message, to dial the number "22" after each operation has been completed; and the receipt of each number "22" at the receiving end of the line advances the shift register 22 to the next operation. In the event that the caller 10 neglects to transmit the number "22", or delays too long in doing so, the timer clock 19 generates its pulse to terminate that operation and advance the shift register 22. As noted above, the timer 19 is preset to provide ample time for completion of each step or operation of the sequence, and the detector circuit 42 permits the caller 10 to selectively shorten each step rather than wait for the longer period of time controlled by the timer 19. In the event that the detector 42 operates before the timer 19, for any one of the operations, the gate circuit 48 is internally arranged (not shown) to prevent the later generated timer 19 pulse from spuriously advancing the register 22.

In many instances it may not be needed to remotely make or change appointments but merely to ascertain the appointment schedules or availabilities of a distant office. For example, a business person on a trip distant from the home office may call that office at night, or after business hours, to automatically receive an updated schedule of appointments for the following day. Similarly, other persons may not need to make an appointment with another, located at a distant place, but merely to determine the schedule, or subschedule of available times on a particular day, or other time period.

Figure 3:
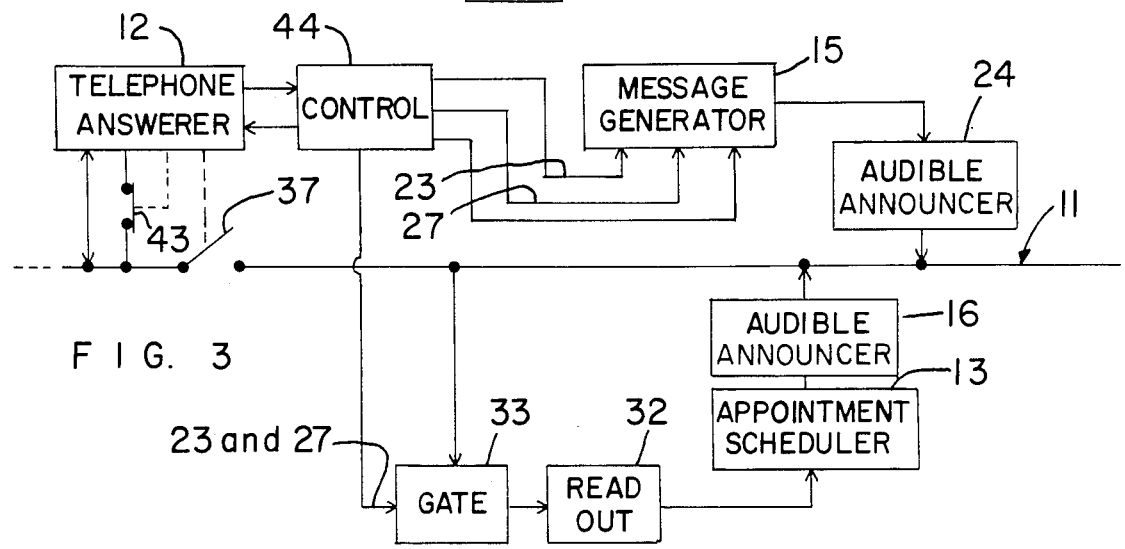
FIG. 3 shows an alternative system that does not make or change appointments but only conveys the schedules or subschedules from one station to another.

The schedule communicating may be performed by a remotely controlled interactive system, similar to FIG. 1, but without the additional controls necessary for remotely entering appointments into the scheduler. FIG. 3 shows one such preferred system for interactively, automatically communicating the schedule or subschedule from one location to another in response to an inquiry by a person at a distant location. As shown, the system includes at the receiving end a telephone answering device 12, a solid state message generator 15 and associated audibilizer 24 for transmitting voice instructions to a caller 10, and an appointment scheduler 13 for retaining in memory a series of schedules of appointments or events for a series of different days or other time periods. Interactively responsive control circuits 44 are also provided for interconnecting these components with the telephone line 11, or other transmission channel. In a manner similar to FIG. 1, the telephone answerer 12 responds to a call over line 11 to close switch 37 interconnecting the receiving system with the line 11. It also sends back an audible message instructing the caller to dictate a message, if desired, and if the caller wishes to automatically obtain a schedule of appointments or availabilities, to reply by dialing, or touch toning into the sending telephone the start code "00", as discussed above. Again as earlier described, this code is detected at the receiving end by circuit 44 and line 23 of the message generator 15 is energized to initiate an audible message back, instructing the caller to dial in the number for the day of interest. Concurrently, the control circuit 44 closes the and gate 33 connecting the read-out circuits 32 of the electronic scheduler 13 to the telephone line 11. Upon the caller responding, the digital number dialed back over line 11 is passed through closed gate 33 and read out circuits to read out the schedule or subschedule for the day or time period selected by the caller.

The control circuit 44 then advances (by timer operation or other, as discussed above), to energize the second line 27 of message generator 15, and also to maintain the gate circuit 33 in closed condition. The caller is then instructed to dial-in the date of a different day, if a schedule is desired for the different day; or if further scheduling information is not required to terminate the call on the sending telephone. The telephone answerer 12 responds to a termination by opening the switches 37 and 43 to disconnect the receiving system and to reset the circuit 44 and gates 33.

In a supplemental system it may be desired to also provide messages back to the caller in addition to scheduling information, or making appointments, all as described above. For example, a businessperson away from the office on a distant trip may not only require updated scheduling information, or wish to make appointments over the phone, but may also desire to obtain informational business messages pertaining to matters that have arisen in his absence from the home office.

Figure 4:
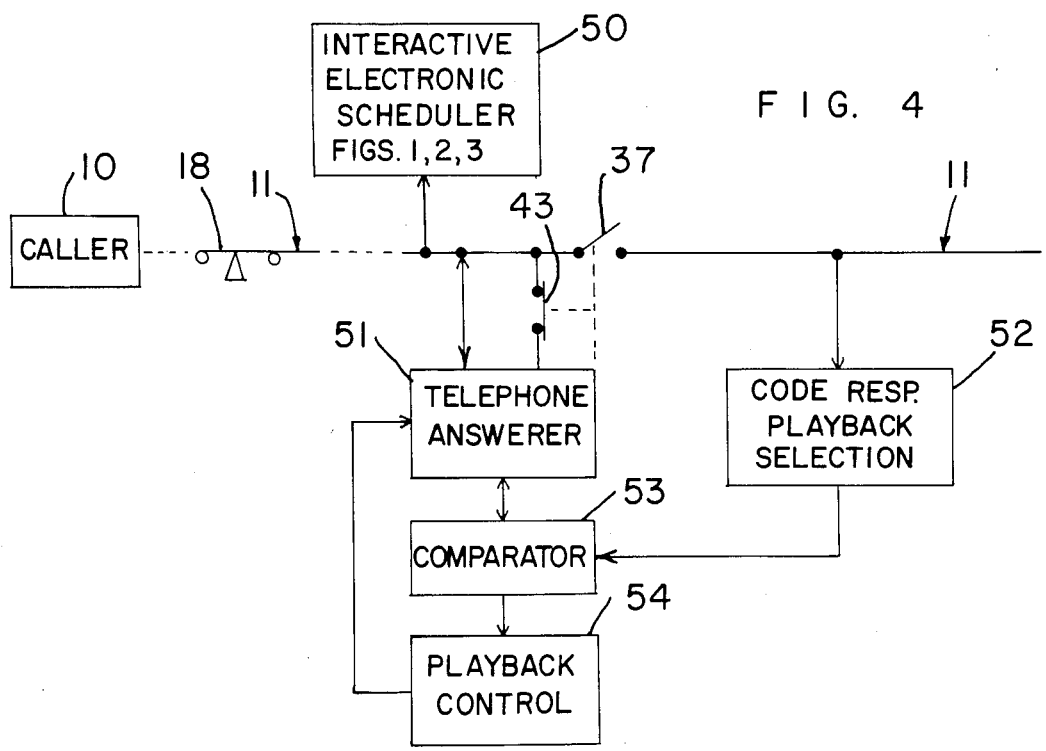
FIG. 4 is a block diagram showing a remote controlled message relaying in combination with a remote controlled scheduling system.

According to the present invention these additional messages can be individually recorded at the home on a magnetic cassette recorder or the like, and selectively played back to the caller in response to interactive requests from the caller, as shown in FIG. 4. Referring to FIG. 4, each message to be separately accessed by the caller is recorded on a recorder in the telephone answerer 51, at the receiving station, along with a different digital address code on the magnetic record preceding each such message. In the event that the caller wishes to access any one or more of these messages, the caller is informed by the telephone answering machine 51, or by a message generator, to dial a given digital number on the calling telephone 18. This initial message code, such as "777" is detected at the receiving end by address detector 52 and the internal recorder of telephone answerer 51 is advanced until it reaches the address of a summary or outline of all recorded messages. The comparator circuit 53 responds to coincidence between this recorded address and that received by code detector 52 to place the recorder into playback mode and read out the "summary" or outline of all of the recorded messages back over line 11 in audible form. The caller is also informed that a more detailed report of any one of these messages can be obtained by dialing in, or touch toning, on the sending telephone 18, the different address code for each different recorded message. In the event that the caller wishes to access any one or more of these messages, the caller dials the address of that message for transmission over the line 11. At the receiver end, the address code detector 52 responds to this code and the drive circuit advances the internal recorder of telephone answerer 51 until the address of the selected message is reached whereupon the comparator circuit 53 detects the matching of the address with the received code and energizes the internal recorder of telephone answerer 51 into playback mode to audibly recite that selected message back over the telephone line 11 to the caller. In a similar manner, the caller can access and receive any one or more of the prerecorded messages that are of interest.

In the event that the caller wishes to signal back to the receiving system that the audible messages have been received, or that specific ones of said messages have been received, a reply message recorder (not shown) may also be provided at the receiver and connected to the line 11 after receiving a reply code, such as "888", dialed back by the caller.

These recorders of the telephone answering machine 51, are placed into the different modes of operation in response to the digital codes from the caller at the sending end of line 11.

Like the appointment announcing and scheduling systems in FIGS. 1,2, and 3, the supplemental message transmitting and recording subsystem in FIG. 4 responds automatically in response to unilateral digital commands from the caller 10 and does not require any human intervention at the receiving end of the communication channel 11. Therefore the scheduling information and transfer of audible messages between the caller 10 and receiving end of the line 11 may be made at any hour of the day or night, or on weekends, regardless of the presence of persons at the receiving end of the line. Also, the caller 10 does not require any special transmitting equipment at the sending end, merely a conventional telephone 18 with a dial or touch tone keyboard, or the equivalent, such as a portable cellular phone, portable terminal, radio terminal, or other, that is capable of sending both voice signals as well as digital or tone signals.

In the event that the receiving station wishes to limit access of the scheduling information and message information to only those persons that have been previously authorized to receive it, security controls may be provided. This may be performed by preinstructing all authorized callers 10 to dial the initial access number "00" after reaching the telephone answerer 12 of FIG. 1 or 50 of FIG. 4 and not audibly informing all callers 10 of that initial access number. Therfore an unauthorized caller 10 cannot interact with the receiving system to obtain the information or perform scheduling functions, or reply recording functions until or unless the caller 10 is given that access number. Those skilled in the art will appreciate that other known controls may be employed to prevent access to the interactive system by persons that are not properly authorized to do so.

As is described in much greater detail in earlier applications, Ser. No. 566,312 and 580,158, the entire system is preferably configured in the form of a small, self-contained, portable device that can be battery powered. The functions described for the memory, electronic clock, and other components may be performed by the use of dedicated integrated microchip circuits that have been available onthe open commercial market. The visual display panels, audible ennunciators, and controls are also available in the form of Liquid crystal display panels, LED's, and other types that are small, solid state and dedicated.

Although only preferred systems and components have been described, those skilled in the art will recognize that many changes may be made without departing from the spirit and scope of this invention. For example, call forwarding and other automatically controlled sending apparatus may be employed at the caller's end of the line 11 to transmit the calling inquiry and codes in an automatic manner and to record the scheduling information and messages at the caller's end of the line. Since these and other changes may be made, this invention is to be considered as being limited only by the following claims:

What is claimed is:

1. A personalized appointment scheduling system for enabling a caller at a sending end of a telephone line to enter an appointment into the scheduling system which is located at a receiving end of the telephone line without the need for human intervention at the receiving end of the telephone line, said scheduling system comprising a small, dedicated, digital, electronic scheduling unit having an electronic memory for storing plural time-of-day appointments for each different day or time period for a series of different days or time periods, said scheduling system including entry circuit means coupleable to the telephone line and responsive to digital entry signals received over said line from a remotely located caller and representing a selected day and time-of-day for entering an appointment into the memory for that day, said scheduling system including a retrieval circuit means connectable to the telephone line for interrogating said memory for any selected day or time period to determine the appointments previously scheduled for that day or time period, and interpreting the memory to derive and read-out and send over the telephone line a subschedule of remaining available times-of-day that are free and have not been previously scheduled for appointment, and a sequentially operated fixed message generator combined with the scheduling unit and responsive to the telephone call from the caller to produce instruction messages over the telephone line to the caller informing the caller of the manner of obtaining the subschedule of available times for a desired day and of the manner of entering an appointment into the memory of the scheduling unit on the desired day, using the caller's telephone.

2. In the scheduling system of claim 1 the addition of a voice recorder at the receiving end of the telephone line, and responsive to a telephone call from a remote caller to record identifying information received from the remote caller to supplement the appointment entered into the memory of the scheduler unit.

3. In the scheduling system of claim 1, the addition of a voice recorder at the receiving end of the telephone line with the scheduler unit, and responsive after entry of an appointment into the scheduler unit by a remorely located caller, to record a voice confirmation of the appointment day and time-of-day in the voice recorder.

4. In the scheduling system of claim 1, the addition of means in
said message generator also instructing the remote caller to dial a different telephone number if the caller desires to make an appointment with a human scheduler in a conventional manner.

5. In the scheduling system of claim 1, the addition of an emergency digital circuit means responsive to receiving an emergency digital number over the telephone line from the remotely located caller to actuate the scheduling system to signal an alarm condition.

6. In the scheduling system of claim 1, the addition of a time-of-day clock coupled to the said entry circuit means of the schuduling system for entering the present time-of-day when the appointment is being made along with the different day and time-of-day of the future appointment.

7. In the scheduling system of claim 1, the addition of a visual display for the scheduler unit for concurrently displaying appointments entered into the memory.

8. In the scheduling system of claim 1, the addition of means in
said message generator additionally instructing the remotely located caller over the telephone line in the manner of proceeding in the event of an emergency.

9. In the scheduling system of claim 1, the addition of a voice recorder at the receiving end of the telephone line,
and said message generator instructing the caller to audibly confirm the entry of an appointment into the memory of the scheduler unit by audibly dictating over the telephone line a confirmation of the appointment day and time-of-day.

10. In the scheduling system of claim 1,
said scheduling system additionally having a keyboard coupled to the entry circuit means for local entry and change of appointments in the memory, and a visual display for selectively displaying the schedule or subschedule of appointments for any selected day or time period.

11. A remote controlled electronic appointment scheduler system comprising:
a small, personalized, self-contained electronic scheduler unit for enabling a user to selectively enter, store, revise, and read-out a schedule of different appointments for each day or other time period, and to enter, store, and revise such schedules for any one of a series of different days or time periods,
said electronic scheduler unit having dedicated components including an electronic memory for storing plural appointments each day or time period, for a series of different days in the future,
said scheduler unit including entry means for enabling the selective entry into the memory of schedules of plural appointments each day for a series of days, and enabling the selective correction and updating of the stored appointments,
said scheduler unit including retrieval means for reading out the memory for any selected day or time period to provide an entire subschedule of availabilities for the selected time period, an output means associated with said retrieval means for audibly announcing the entire subschedule of availabilities for the selected time period, coupling means for interconnecting said entry means, retrieval means, and output means to a telephone line, said coupling means responsive to digital inquiry signals over said telephone line originating from a remotely located caller, to control said retrieval means and output means to announce a subschedule of availabilities over the telephone line for a given day or time period selected by the digital inquiry signals, said coupling means responsive to digital appointment signals received over the telephone line from a remotely located caller to enter an appointment into the memory for a day and time-of-day selected by the caller, and fixed message generating means interconnected with the coupling means and energized after receiving a telephone call from the remote caller to instruct the caller over the telephone line in the manner of using the caller's telephone to obtain subschedules from the scheduler unit, and the manner of entering a new appointment into the scheduler unit at a desired day and time-of-day.

12. The scheduler system of claim 11 further comprising:

a voice recorder associated with the scheduler unit, and responsive after receiving a telephone call from a remote caller to record information audibly received over the telephone line.

13. The scheduler system of claim 11 wherein:

said output and inquiry means responsive to the reception of a digital emergency number over the telephone line from the remote caller to enter an alarm condition into the scheduler unit.

14. In claim 1, the addition of means for revising the subschedule of availabilities sent to subsequent callers over the telephone line after entry of each new appointment into the memory.

* * * * *